Oct. 15, 1935.   R. B. HAMMER   2,017,535
APPARATUS FOR HANDLING MAT BOARD
Filed Feb. 20, 1933   6 Sheets-Sheet 1

Oct. 15, 1935.    R. B. HAMMER    2,017,535
APPARATUS FOR HANDLING MAT BOARD
Filed Feb. 20, 1933    6 Sheets-Sheet 3

Oct. 15, 1935.     R. B. HAMMER     2,017,535

APPARATUS FOR HANDLING MAT BOARD

Filed Feb. 20, 1933     6 Sheets-Sheet 6

Inventor
Richard B. Hammer
By Bair, Freeman & Sinclair
Attorneys

Witness
H. S. Wurgenmaier

Patented Oct. 15, 1935

2,017,535

UNITED STATES PATENT OFFICE 2,017,535

APPARATUS FOR HANDLING MAT BOARD

Richard B. Hammer, Ames, Iowa

Application February 20, 1933, Serial No. 657,608

14 Claims. (Cl. 198—81)

This invention relates to the manufacture of wall board, composition board or the like, and the particular object in general is to provide improved and convenient apparatus for handling and transferring the mat board, at one stage in the process of the manufacture, from the mat forming unit to the press.

A further object of the invention is to provide improved means for cutting the strips of mat board emerging from the mat forming unit into sections of suitable length, these sections then being conveyed by suitable apparatus to novel and convenient press loading racks from which a plurality of said sections may be transferred simultaneously to the press.

Still another object is to provide improved construction for conveying apparatus having conveying mechanism arranged for travel selectively in different directions for feeding the mat board sections as desired to different press loading racks.

Another and further object is to provide improved means for controlling the direction of travel of the mat board through the compound direction conveying units.

Still another object is to provide improved construction for press loading racks, each having a plurality of shelves arranged one above another, said shelves consisting of conveying members arranged to receive the mat board sections and to transfer them simultaneously or individually to multiple section presses.

Another object of the invention is to provide improved controlling mechanism for causing the different shelves of the press loading racks to be loaded in sequence and thereafter to discharge the contents of the series of shelves either individually or simultaneously to corresponding sections of multiple presses.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 10 is an end elevation of one of the multiple shelf press loading racks, this view being taken substantially on the line 10—10 of Figure 9.

Figure 11 is a detail sectional view substantially on the line 11—11 of Figure 9, illustrating particularly certain of the means for controlling the movement and operation of the multiple shelves of one of the press loading racks.

The material to be handled by my improved apparatus is known as mat board, this being the form taken at a certain stage during the process of manufacture of wall board or the like made from fibre, corn stalks or substances of similar composition. This apparatus is designed to take the mat board as it issues in strip form from the mat forming unit, cut it into sections of suitable length and transfer these sections to selected press loading racks, each involving a plurality of superposed shelves and each shelf adapted to receive and hold one of such sections. From the multiple racks the mat board sections are transferred to the presses where the final operation is carried out to complete the manufacture of the wall board by the imposition of pressure.

In the drawings the mat forming unit is designated generally by the character A, but only a very small part of this unit is shown, inasmuch as its construction forms no part of the present invention. The unit A includes a conveyor having a frame 20 in which rollers 22 are journaled, the rollers being driven by intermeshing gearing 24. Over the roller bed of this conveyor the mat board strips are delivered to the initial units of my apparatus.

The present invention involves first a cross cut saw unit designated by the character B and possessing the function of cutting the mat board strips into sections of suitable length as the strips are discharged from the unit A. These sections then travel along the unit C of my apparatus which is a two speed roller conveying unit. The two speed roller unit C is mounted in alignment with the unit A and with the saw unit B interposed between them.

The conveying unit C includes a horizontal frame 26 supported by legs 28 and in the frame 26 are journaled a plurality of rollers 30 and 32 constituting a two speed roller bed. The rollers 30 are located at the initial end of the frame 26 and are driven from and at the same speed as the conveying elements of the mat forming unit A, by means of sprocket gearing 33. The individual rollers 30 are operatively connected by intermeshing gears and are all driven at the same rate of speed, this connection comprising relatively large gears 34 on the rollers and relatively small gears 36 intermeshing with successive gears 34. The individual rollers 32 are operated at the same speed as each other and at a higher rate of speed than the rollers 30 so that the speed of the mat sections is accelerated as said sections approach the end of the unit C. To accomplish this the rollers 32 are provided with gears 38 which intermesh with idler gears 40, this train of gears being connected with the train of gearing for rollers 30 and the gear ratio being such as to produce the desired acceleration of the rollers 32.

As the mat board strips leave the unit A they first engage an idler roller 42 at the initial end of the unit C and then pass across a stationary table 44 having a slot 46 therein extending transversely of the unit C but in a slightly inclined plane. The cutting element of the unit B is designed to travel in the slot 46 for the cutting operation and because of the arrangement of said cutting element and slot the cutting operation advances somewhat longitudinally of the unit C as the mat board moves therealong. In other words, the inclination of the cutting operation conforms to the speed of advance of the mat board so that the cut is at righ angles to the side edges of the mat board strip, thereby cutting the strip into rectangular sections.

The unit B includes a housing which extends across the initial end of the unit C, preferably at the same degree of inclination as the slot 46. The housing includes side walls 48 and a top wall 50 and also segmental sections 52 at each end which substantially enclose the ends of the housing but are movable, as by means of hinge connections 54, to afford access to the interior of the housing.

The housing includes suitable brace members 56 and by these brace members and the respective walls of the housing there are supported a pair of endless tracks 58, one on each side of the housing and extending through the segmental end members 52, the tracks being substantially elliptical or oval in their endless formation. Endless racks or internal gears 60 are mounted parallel with and adjacent the tracks 58 and are of similar formation.

The cutting element and the means for supplying power thereto are supported by a carriage 62 which is in turn supported by rollers 64 traveling on the endless tracks 58, these tracks being of grooved or channel shape in section.

In the carriage 62 is mounted a motor 66 which receives its power from any suitable source of supply, and fixed to one end of the motor shaft is a circular saw element 68 projecting through an opening 70 in the bottom of the carriage and also adapted to project through and travel in the slot 46 of the table. Fixed to the opposite end of the motor shaft is a bevel pinion 72 meshing with a bevel gear 74 which is fixed to a shaft 76 at the forward side of the carriage. Fixed to end portions of the shaft 76 are gears 78, each of which is adapted to engage and travel on one of the endless rack members 60. Because of this engagement the carriage 62, together with the motor and saw element are caused to travel in an orbit defined by the tracks 58 and rack elements 60 and during a portion of such orbital travel, or in other words while the element 68 is traversing the slot 46, the cutting operation is carried out for severing the mat board strips into rectangular sections. The severed sections travel along the unit C and the speed of their movement is of course accelerated when they engage the terminal rollers 32 of said unit.

From the two speed conveying unit C the mat board sections are delivered to compound direction conveying units. As here shown there is a central compound direction unit D and a pair of similar units D', one located at each side of the central section. The central section D is arranged in alignment with the unit C and receives the mat board sections directly therefrom. In some instances the central unit D may be used alone and in that event the mat board sections are delivered directly from this central unit D to the next succeeding unit of the apparatus. At other times the mat board sections are transferred from the central unit D to one or the other of the laterally disposed sections D' and thence to other succeeding units of the apparatus. The purpose of constructing the conveying units D and D' as compound direction units is to cause travel of the mat board sections both longitudinally and laterally, the direction of movement being selected by the operator and under his control. Each of the units D and D' includes a bed of rollers for imparting movement in a direction longitudinally of the apparatus and also a series of spaced conveyer belts interspersed between the individual rollers and adapted to be placed in position for causing transverse or lateral movement. While the roller beds are being employed for causing longitudinal movement, the transverse conveying elements are lowered to a plane below the surface of the roller beds and are inoperative but means is provided for elevating these lateral or transverse conveying units to accomplish the lateral movements of the material being handled.

In general the units D and D' are alike in construction. I will therefore describe the central unit D in detail, it being understood that similar reference characters, with the addition of the prime indication, are applied to the units D'.

The compound direction unit D includes a frame 80 supported by legs or posts 82 and the several units are rigidly secured together by connecting plates 83 fixed to the posts 82 of adjacent units. In the frame 80 are journaled a plurality of rollers 84 which are arranged on the same horizontal level as the rollers of the unit C. The rollers 84 are operatively connected by intermeshing gears 86 and idler gears 88 so that said rollers are all driven in the same direction and at the same speed. The initial roller 84 of the unit D is operatively connected by sprocket gearing 90 with the terminal roller 32 of the unit C so that the rollers 84 are driven preferably at the same accelerated speed as the terminal rollers of the unit C. The rollers 84 constitute the longitudinal conveying elements.

At the opposite lateral sides of the unit D are longitudinally extending conveyor shafts 92, each of which carries a series of spaced pulleys 94. These pulleys are connected in pairs by endless conveyor belts 96. The conveying belts 96 are relatively narrow and each one is arranged between a pair of adjacent rollers 84. The series of narrow belts 96 cooperate to produce the lateral conveying units.

The conveyor shafts 92 are journaled in bearings 98 mounted at the upper ends of supporting rods 100. The rods 100 are arranged for limited vertical movement in slide bearings 102 carried by the frame. There is a supporting rod 100 at each of the four corners of the unit, each of the said rods serving to support a bearing 98 for one end of one of the shafts 92. These rods are bent inwardly in their lower portions and are all connected to a common shank 104 arranged beneath the central part of the unit and having a grooved roller 106 journaled therein, said roller engaging a cam bar 108. The bar 108 extends beneath all of the three units D and D' and is provided with three separate cam elements, one for each of said units. The bar 108 is arranged for sliding movement in guides 109.

The central cam element for the central unit D is provided with a central depression 110 in which the roller 106 normally rests, and the other cam members are provided with like depressions for the rollers of the other units. Each cam member is also provided with an upwardly curved cam face 112 (or 112') at each side of its central depression, said cam face terminating at each side in an elevated seat 114 (or 114'). When the rollers are engaged in the central depression such as 110, the lateral conveying units are in their lowermost or inoperative positions, wherein the surfaces of the belts such as 96 are located below the upper surfaces of the rollers such as 84.

When the cam bar 108 is moved longitudinally in either direction, the rollers such as 106 of all of the units D are caused to ride upwardly on the cam surfaces such as 112, thereby elevating the lateral conveying units by upward thrust on the supporting rods such as 100, the ends of the shafts 92 moving in vertical slots 116 in the posts 82. This upward movement of the parts causes the upper runs of the conveying belts such as 96 to be elevated above the surfaces of the rollers such as 84, whereby the lateral conveying elements are brought into position for operation.

The longitudinal conveying mechanisms of the three units D and D', composed of the rollers 84, are driven continuously during operation of the machine, the rollers of the central member D being driven by the sprocket gearing 90 from the unit C and the rollers 84' of the outermost units D' being driven by suitable belting, not shown, applied to pulleys 91 fixed to the ends of the shafts of certain of said rollers 84', the power being taken from a general line shaft, not shown.

The lateral conveying elements of the units D and D' are driven by independent mechanism which functions to operate the conveyor belts 96 of the central unit D, in either direction, conjunctively with either of the lateral units D' as desired by the operator. This selective driving mechanism will now be described.

A housing 118 is located in the lower part of the unit D and it contains an electric motor 120 which takes its power from any suitable source of supply. In the housing 118 is journaled a clutch shaft 122 having thereon a gear 124 meshing with a driving gear 126 on the motor shaft. A counter-shaft 128 also is journaled in the housing 118.

A slidable clutch member 130 is feathered on the clutch shaft 122 and is adapted to engage a coacting clutch member 132 loosely mounted on said shaft. Formed integrally on the loose clutch member 132 is a sprocket gear element which is engaged by a sprocket chain 134 extending upwardly and outside of the housing. The chain 134 engages a sprocket gear 136 fixed to a shaft 92' of the left hand unit D' and also engages a sprocket gear 138 fixed to the adjacent shaft 92 of the central unit D, thus providing means whereby the lateral conveying elements of the unit D and the left hand unit D' may be driven simultaneously and in the same direction when the coacting clutch elements are engaged.

The feathered clutch element 130 also carries a gear 140 which is adapted to mesh at times with a gear 142 which is fixed on the counter-shaft 128. The latter shaft carries a sprocket gear element which is engaged by a sprocket chain 144, the latter chain also engaging a sprocket gear 146 fixed to a shaft 92' of the right hand unit D' as well as a sprocket gear 148 fixed to the adjacent shaft 92 of the central unit D. In this manner means is provided for operating the lateral conveying elements of the central unit D and the right hand unit D' simultaneously and in the same direction when the gears 140 and 142 are engaged.

A rock shaft 150 is suitably journaled, as in the lower part of the frame of the right hand unit D', and a hand lever 152 is fixed to said rock shaft. The rock shaft 150 is connected by a link 154 with the sliding cam bar 108, providing means whereby said bar may be reciprocated selectively in either direction by appropriate oscillation of the lever 152.

The rock shaft 150 is also connected by a crank arm 155 and link 156 with a control bar 158 which is slidably mounted in the housing 118 and in a slide bearing 160, the inner end of said control bar being pivotally connected to a bell crank 162 fulcrumed in the housing. The opposite end of the bell crank is forked and engages a peripheral groove of the feathered clutch member 130. When the hand lever 152 is shifted in one direction, namely to the left in Figure 5, the control bar 158 is moved forwardly or to the left and results in an oscillation of the bell crank 162, whereby the clutch member 130 is caused to engage with the loose clutch member 132, thereby establishing an operative connection between the clutch shaft and the driving mechanism which includes the chain 134 and sprocket gears 136 and 138. Because of this connection the lateral conveying elements of the central unit D and the left hand unit D' are caused to move toward the left.

Figures 1, 2, 3:
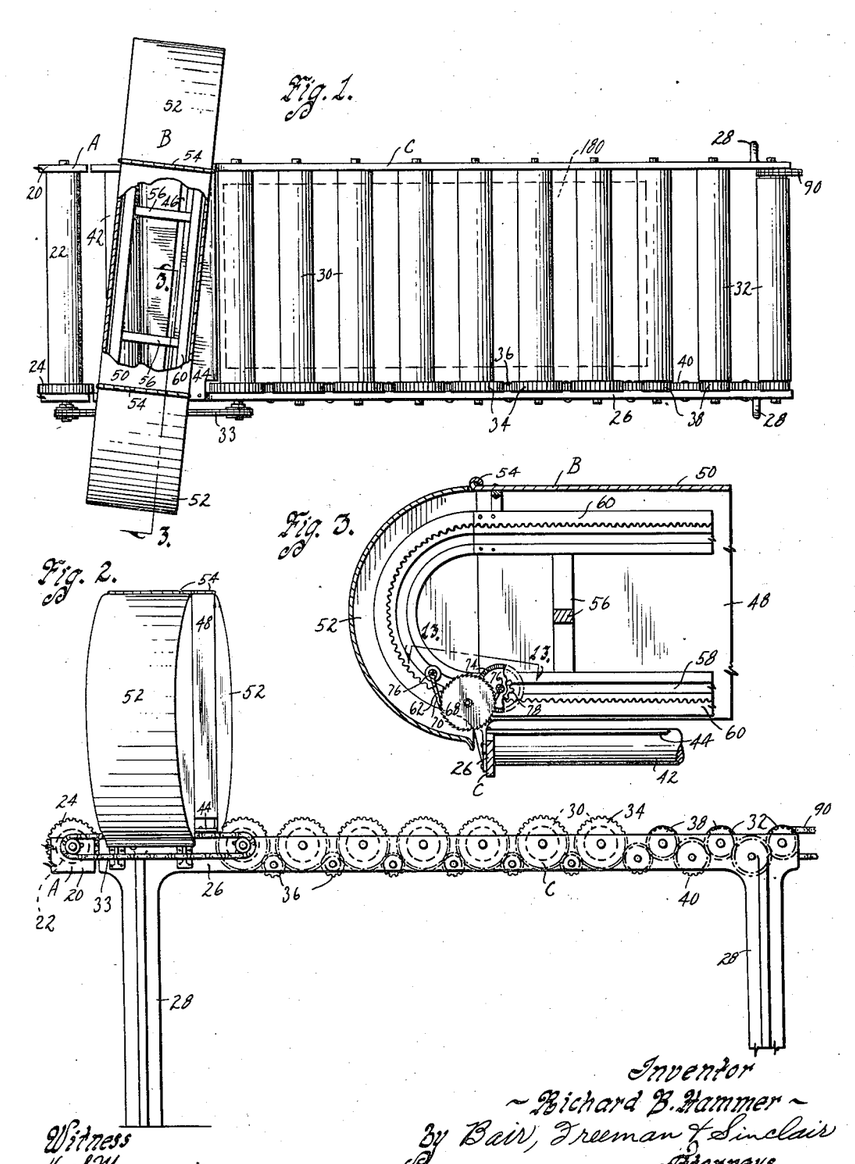
Figure 1 is a plan view, partly in section, illustrating the initial portion of the apparatus including the saw unit for cutting the mat strip into sections.
Figure 2 is a side elevation of the elements shown in Figure 1.
Figure 3 is a longitudinal section through a portion of the saw unit on the line 3—3 of Figure 1.
Figure 4:
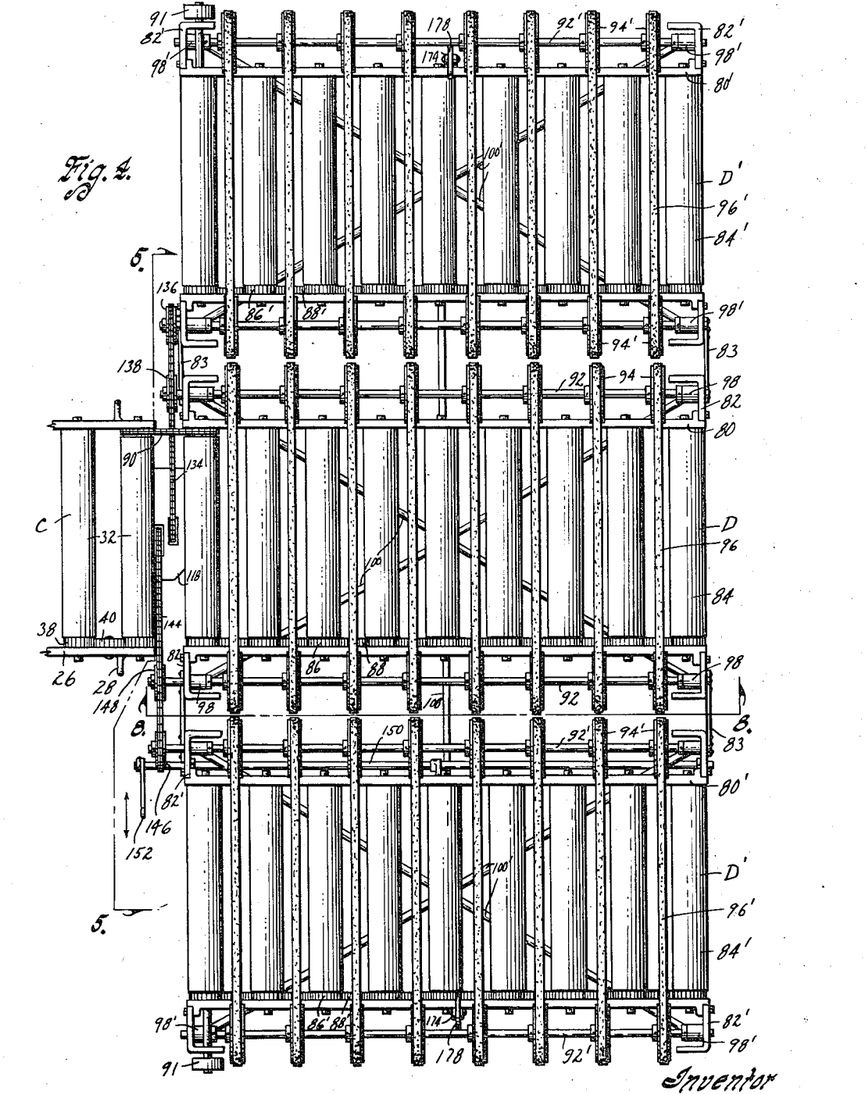
Figure 4 is a plan view of a series of multiple direction conveying units upon which the mat board sections are received from the apparatus shown in Figure 1.
Figure 5:
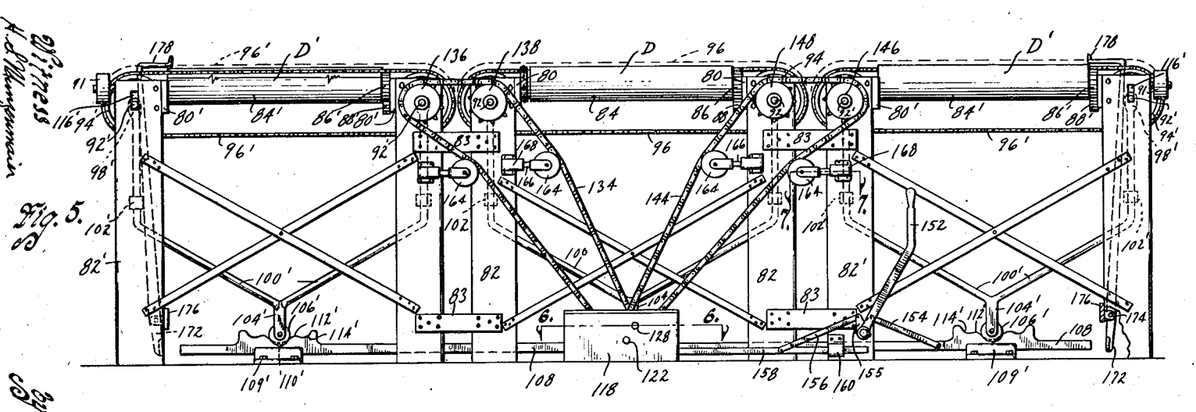
Figure 5 is a front elevation of the units shown in Figure 4, together with the control means for the same.

An opposite shifting of the lever 152, namely to the right in Figure 5, causes the bell crank lever 162 to be oscillated in the opposite direction, thereby engaging the gear 140 with the gear 142 and establishing an operative connection through the counter-shaft 128, chain 144 and sprocket gears 146 and 148. This results in an operation of the lateral conveying elements of the central unit D and right hand unit D' toward the right.

Movement of the hand lever 152 in either direction as just described will likewise result in a shifting of the cam bar 108 whereby the lateral conveying elements of all three units D and D' are elevated as previously described.

Figures 6, 7:
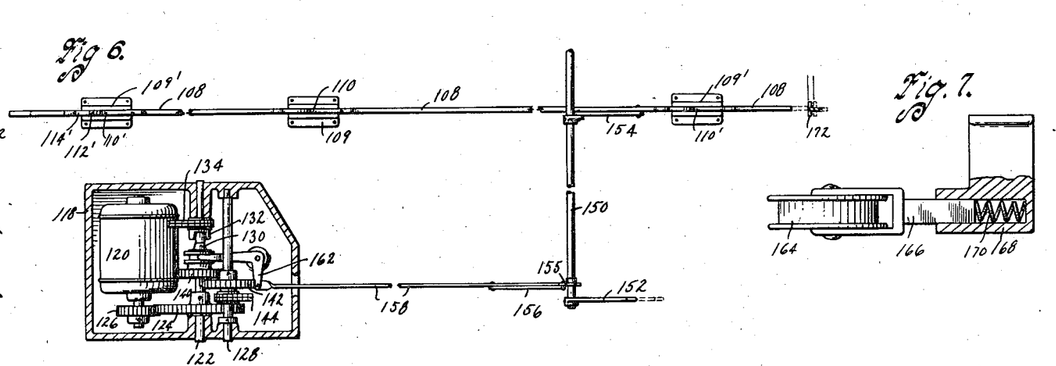
Figure 6 is an enlarged section on the line 6—6 of Figure 5, illustrating particularly the means for supplying power to the compound direction conveying units, and the control means therefor.
Figure 7 is a detail substantially on the line 7—7 of Figure 5, illustrating a spring pressed chain tightener employed for the driving chains of the conveying units.

It will be seen therefore that by shifting the lever 150 the operator may not only place the lateral conveying units in position to function, irrespective of the longitudinal conveying elements 84 and 84', but also cause material on the central unit D to be lifted and moved laterally in the selected direction to and upon either of the laterally disposed units D'. In other words, mat board sections which have been deposited upon the central unit D, by operation of the rollers of the unit C and the longitudinal conveying rollers 84, may be moved laterally upon either of the units D', by bringing the selected lateral conveying elements into operation. It is obvious that on account of the vertical movement of the shafts which carry the sprockets 136, 138, 146 and 148, some provision must be made for slack in the chains 134 and 144 and for taking up this slack when the elements are in their down positions. For this purpose tightener pulleys 164 are provided, one engaging each run of each of the chains 134 and 144. The pulleys 164 are carried by forks 166 having their shanks slidably mounted in bearings 168 fixed to appropriate frame members such as the posts 82 and 82'. The forks and tightener pulleys are yieldingly urged outwardly of the bearings by means of coil springs 170 as shown in Figure 7 and thus means is provided for applying yielding tension to the sprocket chains.

Means also is provided for automatically restoring the lateral conveying elements to inoperative position for stopping the driving connections when the mat board sections have been delivered to the laterally disposed units D'. This means includes a pair of levers 172, one of which is mounted in substantially vertical position at the outer side of each of the units D' and fulcrumed near its lower end at the point 174 on a cross bar 176 connecting the outer posts 82' of the unit. At their upper ends the levers 172 are turned inwardly and are provided with upwardly projecting lugs 178.

The lower ends of the levers 172 are arranged in alignment with the cam bar 108 and are respectively spaced slightly beyond the outer ends of said bar when the latter member is in its central position. When the bar 108 is shifted in either direction for elevating the lateral conveying units, one end of said bar engages one of the levers 172 and oscillates its upper end toward the median line of the adjacent unit, the lever being held in this position by said cam bar. When a mat section such as 180 is moved upon one of the laterally disposed units D' its outer edge finally engages the upturned lug 178 and in its movement oscillates the lever 172 toward normal position, thereby effecting inward pressure through the lower end of said lever upon the cam bar 108. A small amount of pressure is sufficient to start the bar 108 toward the center of the machine and the cam surfaces such as 112 permit the rollers such as 106 to travel down to the central notches such as 110, thereby causing the bar 108 to assume its central or neutral position and permitting the lateral elevating elements to be lowered to inoperative position. This movement of the bar 108 also causes an oscillation of the rock shaft 150 whereby the bell crank 162 is returned to neutral position through the link 156 and control bar 158, and by this movement the clutch elements are disengaged and the operation of the lateral conveying units is terminated.

It will be remembered that the longitudinal conveying elements of the units D and D' are driven continuously. It follows therefore that as soon as the operation just described has been completed, resulting in a lowering of the lateral conveying elements 96 to inoperative position, the mat board sections such as 180 will be deposited upon the rollers 84' and will be moved thereby in a direction longitudinally of the unit D' upon which they have been deposited. That is to say—as soon as the sections have been moved laterally the required distance to be placed upon either of the sections D', they will at once, and through automatic operation, commence to travel in a longitudinal direction whereby they will be discharged from the units D' upon the next succeeding units of the apparatus.

From the compound direction units D and D' the mat boards are delivered to racks designated by the characters E and E' respectively. The central rack unit E is in line with the central unit D and the units E' are laterally disposed and in line with the respective units D'. Each rack unit includes a series of vertically spaced shelves. These shelves are adapted to be placed successively in position for receiving mat boards from the aligned units D and D'. After all or the desired number of shelves of a rack unit are loaded, these shelves are then caused to individually or simultaneously discharge their loads to a press. The presses are aligned with the rack units E and E' and are designated by the characters F and F' respectively, each press having a series of vertically spaced compartments with which the shelves of the racks are adapted to align.

The press loading rack units are alike in construction and the various parts thereof are designated by similar reference characters with the addition of the prime designation for those applying to the units E'.

The unit E includes four threaded columns 182 arranged in vertical position at the four corners of the unit. The units E and E' are of greater vertical height than the preceeding units of the apparatus and the threaded columns form the supports for the series of vertically movable shelves and are located partially within a pit 184. The columns are rotatably mounted in step bearings 186 forming part of a base member 188 located in the bottom of the pit. The upper ends of the columns are journaled in bearings 190 carried by a top frame 192. The shelves may initially be located so that the uppermost shelf is in the same horizontal plane as the longitudinal conveying elements of the units D and D' and thereafter be elevated by rotation of the columns 182 for the successive loading of the other shelves.

Each shelf of the rack E is a conveying element including a frame 194 having at its corners interiorly threaded hubs 196 having threaded engagement with the columns 182. At the initial end of each conveyor frame 194 there is journaled a conveyor shaft 198 or 199 upon which a roller 200 is fixed, and an endless conveyor belt 202 engages said rollers as well as other rollers 204 carried by the frame.

Figures 8, 12, 20:
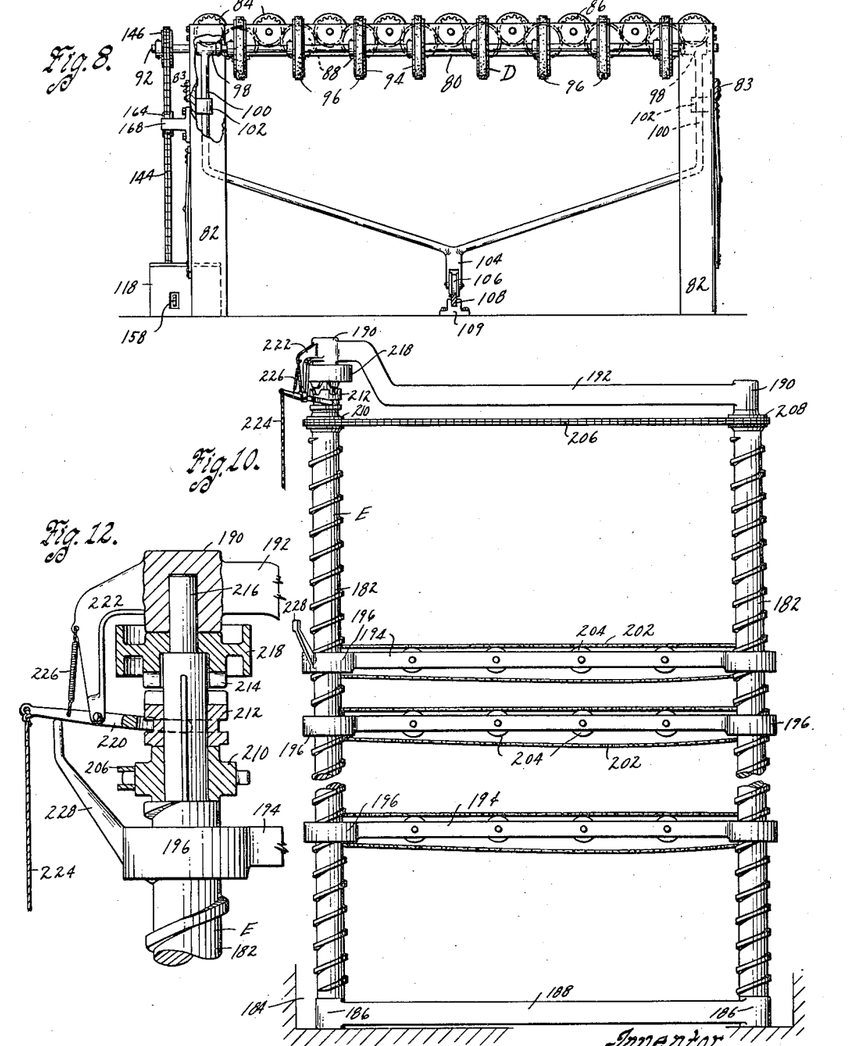
Figure 8 is an end elevation of one of the compound direction conveying units.
Figure 12 is a detail view on the line 12—12 of Figure 9, illustrating clutch mechanism employed for controlling the elevation of the multiple shelves of a press loading rack.
Figure 9:
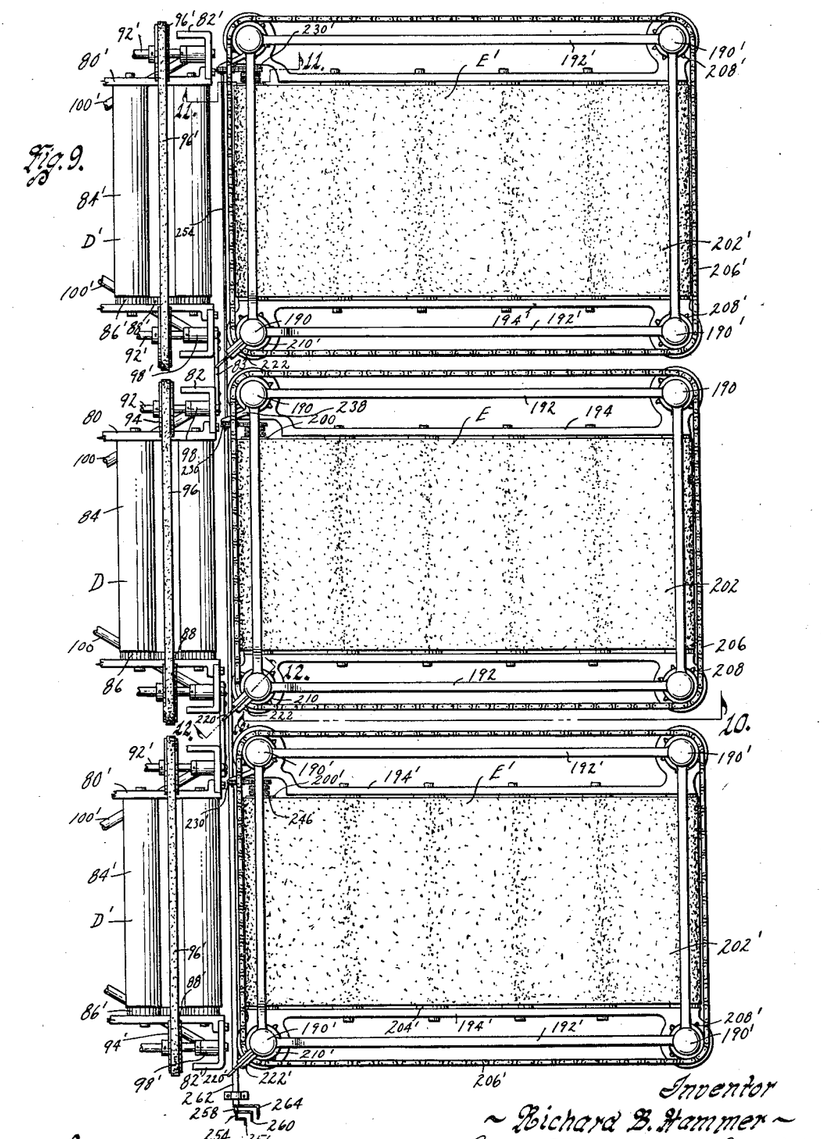
Figure 9 is a plan view of a series of press loading racks upon which the mat board sections are received selectively from the conveying elements shown in Figure 4.

The various shelves or conveying elements of the rack unit E are uniformly spaced apart and are capable of being simultaneously raised and lowered by conjunctive rotary movement of the four threaded columns 182. To accomplish this rotary movement the columns are connected by a sprocket chain 206 engaging sprocket gears 208 fixed to the upper ends of three of said columns and a sprocket gear 210 having a feathered connection with the fourth one of said columns as illustrated particularly in Figure 12. The feathered sprocket 210 has a clutch member 212 fixed thereto on its upper face and adapted to coact with a clutch member 214 which is loosely mounted on a shaft 216 forming a continuation of the column. A belt pulley 218 is fixed to the loose sprocket member 214 and is adapted to be driven by suitable connections, not shown, with the general line shaft heretofore referred to or other suitable power means.

The sliding clutch member 212 is peripherally grooved and is engaged by a forked lever 220 fulcrumed between its ends on a bracket 222. An operating cable 224 is fixed to the outer end of the lever 220 and when draft is applied thereto manually the lever is oscillated for the purpose of sliding the clutch member 212, and with it the sprocket 210, so that engagement is made with the loose clutch member 214. When rotary movement is imparted to the belt pulley 218, this results through the interengaging clutch connections in rotary movement of the shaft 216 and the threaded column associated therewith and such movement is likewise imparted to the other threaded columns by means of the sprocket driving connections. A spring 226 is employed as a yielding connection between the lever 220 and bracket 222 for the purpose of holding said lever in such position that the clutch members are disengaged and for returning them to disengaged position after draft upon the cable 224 has been released. It will be understood that the shelves are advanced only a short distance at each operation, such distance corresponding substantially to the spacing of the shelves, in order that they may be successively brought into position for loading from the unit D. To prevent injury to the mechanism through too long continued engagement of the clutch members, an inclined arm 228 is fixed to the frame of the uppermost shelf of the unit and is adapted to engage the outer end of the lever 220 when the shelves have reached the uppermost limit of movement, thereby causing the lever to be moved to position for disengaging the clutch members.

The conveying units which constitute the spaced shelves of the racks are capable of free and independent movement for loading purposes, thereby permitting mat boards to be pushed thereupon by the positive action of the longitudinal conveying elements of the units D and D'. In other words—the mat boards are discharged from the rollers 84 or 84' of the compound direction units D and D' and are received upon the endless conveyor belts 202 which are at the time aligned therewith in the same horizontal plane, and said belts are permitted to travel under the impetus given to the advancing mat boards by the positive drive on the rollers of the preceding units.

Moreover, the shelves or conveying elements of each rack are also capable of simultaneous forward operation through positive driving connections, for the purpose of unloading all of said shelves or conveying elements into the corresponding compartments of the presses F or F'. Consequently it is necessary to provide positive driving connections for all of the conveying elements of a unit, together with releasable connections to permit the independent movement of individual shelves during the loading operation.

For effecting the simultaneous operation of the conveying elements of each rack for the unloading operation there is provided a vertically disposed sprocket chain 230 which engages at its lower end a sprocket 232 carried by a fixed bracket 234 and which engages at its upper end a sprocket 236 carried by a fixed bracket 238. The sprocket chain 230 has a direct connection with the conveying elements of one of the shelves of the rack and in this instance such connection is made to the second shelf from the top of the series. From the shelf or conveying element thus driven, suitable driving connections are provided to the other shelves or conveying elements in series.

At its intermediate portion the driving sprocket chain 230 is formed with a laterally extending bight which engages direction pulleys 240 suitably journaled on the frame of the element to be driven, and said bight portion operatively engages a sprocket wheel 242 loosely mounted on the shaft of said element. The shaft in this instance is designated by the numeral 198 previously referred to, this being the shaft of the conveying element which is driven directly from the driving sprocket chain 230, whereas the shafts of the other elements for convenience and to differentiate them from the master shaft 198, are designated by the numeral 199. The shaft 198 is provided with sprocket gearing connections to the shafts 199 of each adjacent shelf or conveying element, such sprocket connections including a sprocket gear 244 fixed by pins or the like 245 to the gear 242, a chain 246 and a driven sprocket 248 engaged by said chain. Each conveying element driven from the main element is connected in turn with the next succeeding element by similar means until all are provided with suitable driving connections and in each instance the driven sprocket gear 248 is exactly similar in construction to the gear 242 which is shown in detail in Figure 15. This involves a ratchet construction and means for connection with the shaft, permitting the sprocket to remain idle and the shaft to turn freely relative thereto when driving force is applied to the conveyor belt 202 in the loading operation; and providing that the sprocket be employed as a driving element for turning the shaft when driving force is applied through the sprocket chain 230 and its connections.

Figures 12, 13, 14, 15, 16, 17, 18:
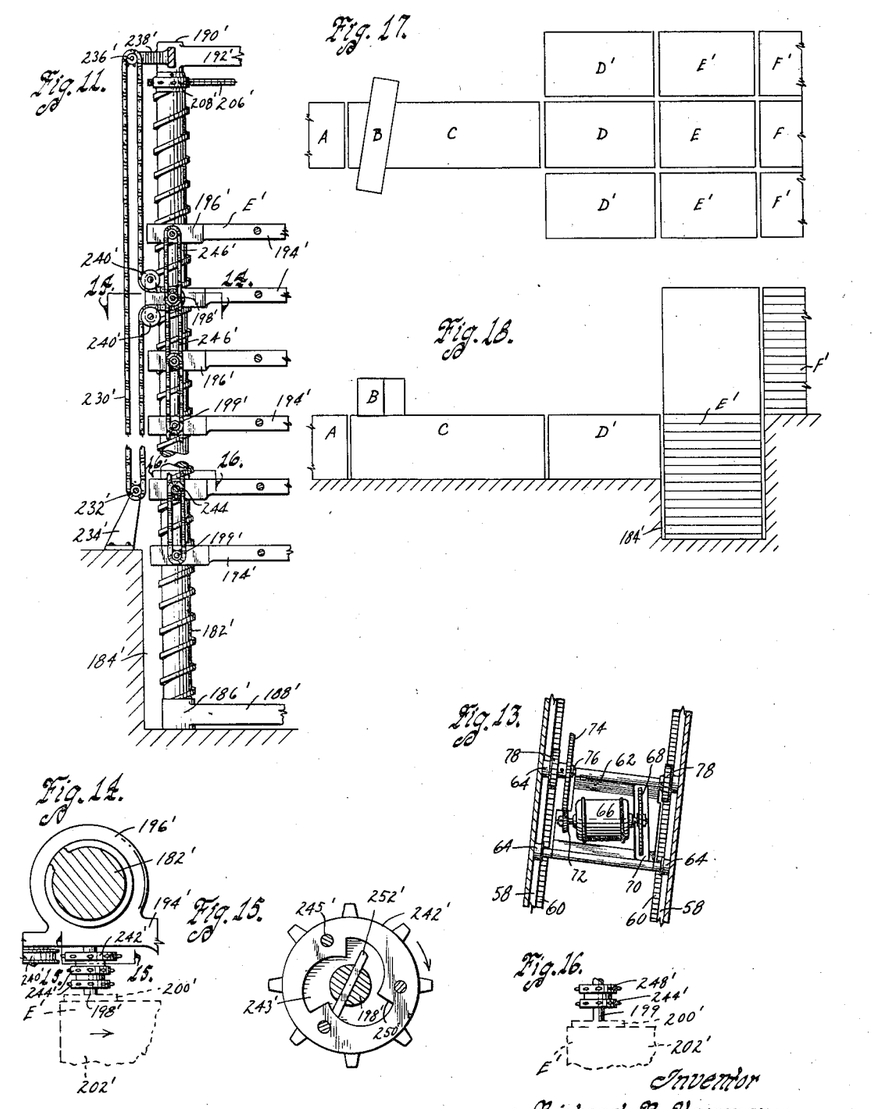
Figure 13 is a sectional view through a portion of the saw unit, taken on the line 13—13 of Figure 3.
Figure 14 is a sectional view on the line 14—14 of Figure 11, illustrating certain of the mechanism for controlling the operation of the respective shelves of a press loading rack.
Figure 15 is a detail sectional view on the line 15—15 of Figure 14.
Figure 16 is a view similar to Figure 14 but relating to the driving mechanism of another of the shelves and taken on the line 16—16 of Figure 11.
Figure 17 is a diagrammatic plan view or conventionalized layout of various units involved in and associated with my improvement.
Figure 18 is a similar general view of the units in side elevation.

Turning now to Figure 15 it will be noted that the sprocket gear 242 is formed with an internal recess 243 having a series of radial shoulders or internal teeth 250 connected by irregular curves to produce an internal ratchet. The shaft 198 extends within and axially of this internal recess and is provided with a diametrically arranged slidable pawl 252 which is adapted to be engaged by one or the other of the radial shoulders or internal ratchet teeth 250. In this manner the shaft 198 is adapted to be driven positively by rotation of the sprocket gear 242 in the direction of the arrow, and this rotary movement is communicated to the corresponding shafts 199 of the other shelves or conveying units by the sprocket connections previously referred to.

On the other hand the shaft 198 (and likewise each shaft 199) is permitted to turn freely in a clockwise direction, without affecting its sprocket gear such as 242, thereby permitting the conveying belt associated with said shaft through the initial roller 200 of the series, and without affecting any of the other conveying units during the individual loading operations, inasmuch as the sliding pawl 252 passes freely over the curved surfaces connecting the internal teeth 250.

Suitable means is provided for manually imparting movement to the driving sprocket chain 230 of each of the units E and E'. For convenience I have illustrated this driving means for one of the outside units as taking the form of a shaft 254 having a crank 256 on one end, the opposite end of said shaft being connected rigidly to the lowermost sprocket gear 232 of the unit in question.

For the intermediate unit E I employ a sleeve 258 which is rotatably mounted on a portion of the shaft 254 and connected at one end to the lowermost sprocket 232 of the central unit, said sleeve having at its outer end a hand crank 260.

For the other outside unit I employ another sleeve 262 rotatably mounted on a portion of the sleeve 258 and connected at its inner end to the lower sprocket 232 of that unit, the last named sleeve having a crank 264 at its outer end. Either of the cranks 256 or 260 or 264 may be operated for driving the sprocket chain 230 of the selected unit and such operation results in actuation of all of the conveying elements or shelves of the unit in question.

This operation is carried out after the shelves of a unit have been loaded and results in the simultaneous discharge of all mat boards from such unit into the corresponding and horizontally aligned compartments of a press such as F or F'.

The presses themselves form no part of my invention and have been illustrated only conventionally in Figures 17 and 18 for the purpose of showing their relation to the press loading racks. It will be understood that the presses may be of any common and well known construction involving means for simultaneously applying the desired amount of pressure to a series of mat boards placed in the compartments provided therefor.

This apparatus provides efficient and yet comparatively simple mechanical means, not only for severing the mat board strips into sections of the desired length but also for transferring these sections, without danger of injury thereto, to the presses where the final step of the manufacturing process is carried out.

The multiple shelf press loading racks provide a very convenient means wherein a series of mat boards may be successively received and be transferred simultaneously and rapidly to an appropriate press.

It will be noted that from the two speed conveying unit C the mat boards may be transferred in a straight line across the central conveying unit D to the central rack E and thence to the central press F. Whenever the press F has been loaded, the operator may, by actuating the hand lever 152, cause the mat boards to be carried laterally from the central conveying unit D to one or the other of the laterally disposed units D', by making use of the compound direction conveying elements of these units; and from the laterally disposed units D' the mat boards are discharged to one or another of the laterally disposed racks E' and thence to the presses F'.

Because of this arrangement a continuous operation may be carried out by successively loading the various racks and by discharging their contents to the adjacent presses, thus permitting substantially continuous operation of the mat forming unit indicated at A and the saw unit B. This makes for economy by enabling the apparatus to be used to full capacity and by eliminating manual labor for handling of the mat board sections.

After the spaces of a press-loading rack have been unloaded, its shelves for conveying units may be returned to their lowermost position by causing a reverse rotation of the threaded columns 182. This reverse rotation may be accomplished by any suitable means (not shown), for causing reverse rotation of the belt pulley 218 and by causing engagement of the clutch elements 212 and 214 until such time as the lowermost shelf of the unit has reached the bottom of the pit 184.

In lieu of the means for simultaneously operating the superposed shelves or conveying elements of the racks E and E' as herein described, any suitable means may be employed for individually operating these elements and discharging the individual mat boards to the desired locations.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. Apparatus of the character set forth comprising a plurality of press-loading racks placed side by side, each rack having a plurality of superposed spaces, a plurality of compound-direction conveying units aligned with the respective racks, each of said units having longitudinal conveying elements and lateral conveying elements adapted to be placed selectively in condition for effective operation, means for depositing mat board or the like on the central unit, the longitudinal conveying elements of said central unit being operable to deliver a load to the central rack, means selectively operable to place the lateral conveying elements of the central unit in position to engage a load thereon and transfer the same to either laterally disposed unit, the longitudinal conveying elements of the latter units being operable to deliver a load to the aligned laterally disposed rack.

2. Apparatus for handling mat board and the like, comprising a central rack and a pair of opposite laterally disposed racks to which the material is to be delivered, a plurality of conveying units aligned with the respective racks, each of said units including constantly driven longitudinal conveying elements adapted to deliver material to the aligned racks, the central unit also including lateral conveying elements selectively operable in either direction and normally located below the level of its longitudinal conveying elements, means under manual control for elevating said lateral conveying elements and causing them to pick up material on the central unit, and means for simultaneously causing said lateral conveying elements to be driven in the desired direction for delivering such material to one of the laterally disposed units, the latter unit then acting through its longitudinal conveying elements to deliver such material to the aligned rack.

3. Apparatus for handling mat board and the like comprising a central conveying unit and a conveying unit disposed laterally on each side of said central unit, each of said units having longitudinal conveying elements for discharging material to suitable aligned receiving means, a delivery conveyor communicating with the central unit and adapted to deliver material upon its longitudinal conveying elements, the central unit also including lateral conveying elements under manual control to pick up material from its longitudinal conveying elements and transfer the same selectively to either of the laterally disposed units, such laterally disposed unit then acting through its longitudinal conveying elements for discharging such material to the aligned receiving means.

4. In apparatus for handling mat board and the like, a conveying unit comprising a frame, a bed of rollers journaled in said frame and constituting a longitudinal conveying means, shafts journaled at right angles to the rollers, belt pulleys on said shafts, conveyor belts engaging the pulleys and alternating with the rollers, said belts normally being located below the upper surfaces of the rollers, said belts constituting a lateral conveying means, a slidably mounted bar having a cam thereon, and a thrust element coacting therewith and supporting said shafts for raising and lowering them to place the conveyor belts in operative and inoperative positions respectively.

5. In apparatus for handling mat board and the like, a conveying unit comprising a frame, a bed of rollers journaled in said frame and constituting a longitudinal conveying means, shafts journaled at right angles to the rollers, belt pulleys on said shafts, conveyor belts engaging the pulleys and alternating with the rollers, said belts normally being located below the upper surfaces of the rollers, said belts constituting a lateral conveying means, a slidably mounted bar having a cam thereon, and a thrust element coacting therewith and supporting said shafts for raising and lowering them to place the conveyor belts in operative and inoperative positions respectively, driving mechanism for said shafts, and means for actuating said driving mechanism to and from operative position, said means operating simultaneously with said bar for raising and lowering said shafts.

6. In apparatus for handling mat board and the like, a series of three compound direction conveying units placed side by side, each of said units including longitudinal conveying elements, each of said units also including lateral conveying elements having their conveying surfaces normally located below the conveying surfaces of the longitudinal conveying elements, means under manual control for raising and lowering the lateral conveying elements of said units, and means under manual control for operating the lateral conveying elements of the central unit selectively in either direction and at the same time operating the lateral conveying elements of one of the laterally disposed units.

7. In apparatus for handling mat board and the like, a series of three compound direction conveying units placed side by side, each of said units including longitudinal conveying elements, each of said units also including lateral conveying elements having their conveying surfaces normally located below the conveying surfaces of the longitudinal conveying elements, means under manual control for raising and lowering the lateral conveying elements of said units, driving means engaging the lateral conveying elements of the central unit for operating the same in one direction and also engaging the lateral conveying elements of one of the laterally disposed units for driving such elements in the same direction, separate driving means engaging the lateral conveying elements of the central unit for driving the same in the opposite direction and also engaging the lateral conveying elements of the other laterally disposed unit, and means under manual control for selectively placing either of the two driving means in operation simultaneously with the operation of raising the lateral conveying elements of the units.

8. In apparatus for handling mat board and the like, a series of three compound direction conveying units placed side by side, each of said units including longitudinal conveying elements, each of said units also including lateral conveying elements having their conveying surfaces normally located below the conveying surfaces of the longitudinal conveying elements, means under manual control for raising and lowering the lateral conveying elements of said units, driving means engaging the lateral conveying elements of the central unit for operating the same in one direction and also engaging the lateral conveying elements of one of the laterally disposed units for driving such elements in the same direction, separate driving means engaging the lateral conveying elements of the central unit for driving the same in the opposite direction and also engaging the lateral conveying elements of the other laterally disposed unit, means under manual control for selectively placing either of the two driving means in operation simultaneously with the operation of raising the lateral conveying elements of the units, and means engageable by material deposited upon either of the laterally disposed units for automatically returning said driving means to inoperative position and at the same time lowering the lateral conveying elements of the respective units to inoperative position.

9. In apparatus for handling mat board and the like, a series of conveying units placed side by side, each of said units including longitudinal conveying elements, each of said units also including lateral conveying elements having their conveying surfaces normally located below the surfaces of the longitudinal conveying elements, vertically movable supporting means for said lateral conveying elements, a reciprocable cam bar engaged by said supporting means, separate clutch controlled driving means for selectively operating the lateral conveying elements of one unit in either direction, each of said driving means also engaging the lateral conveying elements of another unit and a manual control mechanism operable for shifting said cam bar for lifting said supporting means and thereby elevating the lateral conveying elements of the units to operative position, said control means also acting to place one or another of the separate driving means in operation through engagement of its clutch devices.

10. In apparatus for handling mat board and the like, the combination with a conveying unit of a rack having a series of superposed shelves, and a vertical shaft threadedly associated with each corner of each shaft for vertically moving said shelves upon rotation of said shafts so that the shelves are moved successively into position for receiving material from said unit.

11. In apparatus for handling mat board and the like, the combination with a conveying unit of a rack having a series of superposed shelves, means for vertically moving said shelves successively into position for receiving material from said unit, each of said shelves having the character of a conveying element, and means for causing simultaneous operation of said conveying elements for unloading material simultaneously from all of the shelves.

12. In apparatus for handling mat board and the like, a press-loading rack comprising a plurality of threaded columns, a plurality of superposed frames, each having threaded engagement with said columns, means for simultaneously rotating said columns to simultaneously move all of said frames in a vertical direction, conveying elements carried by each of said frames, and means for simultaneously operating all of said conveying elements for discharging the contents therefrom.

13. In apparatus for handling mat board and the like, a press-loading rack comprising a plurality of threaded columns, a plurality of superposed frames, each having threaded engagement with said columns, means for simultaneously rotating said columns to simultaneously move all of said frames in a vertical direction, conveying elements carried by each of said frames, each of said conveying elements being independently movable for advancing material thereupon during the loading operation, and means for simultaneously operating all of said conveying elements for discharging the contents therefrom.

14. In apparatus for handling mat board and the like, the combination with a conveying unit of a rack having a series of superposed shelves, and a vertical shaft threadedly associated with each corner of each shelf or vertically moving said shelves upon rotation of said shafts so that the shelves are moved successively into position for receiving material from said unit, said shafts being connected together for simultaneous rotation.

RICHARD B. HAMMER.